United States Patent [19]
Schatz

[11] Patent Number: 5,934,071
[45] Date of Patent: Aug. 10, 1999

[54] ASSEMBLY FOR REDUCING THE EXHAUST GAS EMISSIONS OF AN INTERNAL COMBUSTION ENGINE

[75] Inventor: Oskar Schatz, Gauting, Germany

[73] Assignee: Schatz Thermo Gastech GmbH, Erling Andechs, Germany

[21] Appl. No.: 08/737,386

[22] PCT Filed: Mar. 7, 1996

[86] PCT No.: PCT/EP96/00981

§ 371 Date: Nov. 6, 1996

§ 102(e) Date: Nov. 6, 1996

[87] PCT Pub. No.: WO96/27734

PCT Pub. Date: Sep. 12, 1996

[30] Foreign Application Priority Data

Mar. 7, 1995 [DE] Germany .......................... 195 07 977

[51] Int. Cl.$^6$ ...................................... F01N 3/00
[52] U.S. Cl. ................................ 60/284; 60/288; 60/300; 60/303

[58] Field of Search .............................. 60/284, 303, 300, 60/286, 288

[56] References Cited

U.S. PATENT DOCUMENTS

| | | | |
|---|---|---|---|
| 3,824,788 | 7/1974 | Cole et al. ................................. | 60/284 |
| 5,307,628 | 5/1994 | Castagne ................................... | 60/284 |
| 5,345,762 | 9/1994 | Lutze ........................................ | 60/288 |
| 5,582,003 | 12/1996 | Patil et al. ................................ | 60/288 |
| 5,634,332 | 6/1997 | Tanaka et al. ............................. | 60/284 |

*Primary Examiner*—Thomas E. Denion
*Attorney, Agent, or Firm*—Harness, Dickey & Pierce, PLC

[57] ABSTRACT

In order to reduce the exhaust gas emissions of automotive vehicle combustion engines including exhaust gas catalytic converters, the exhaust gases are caused to flow between the engine and the catalytic converter through conduit branches of different thermal characteristics. Said conduit branches comprise a full load tube and a partial load tube, with the full load tube surrounding the partial load tube so as to provide an annular space between the full load tube and the partial load tube.

18 Claims, 8 Drawing Sheets

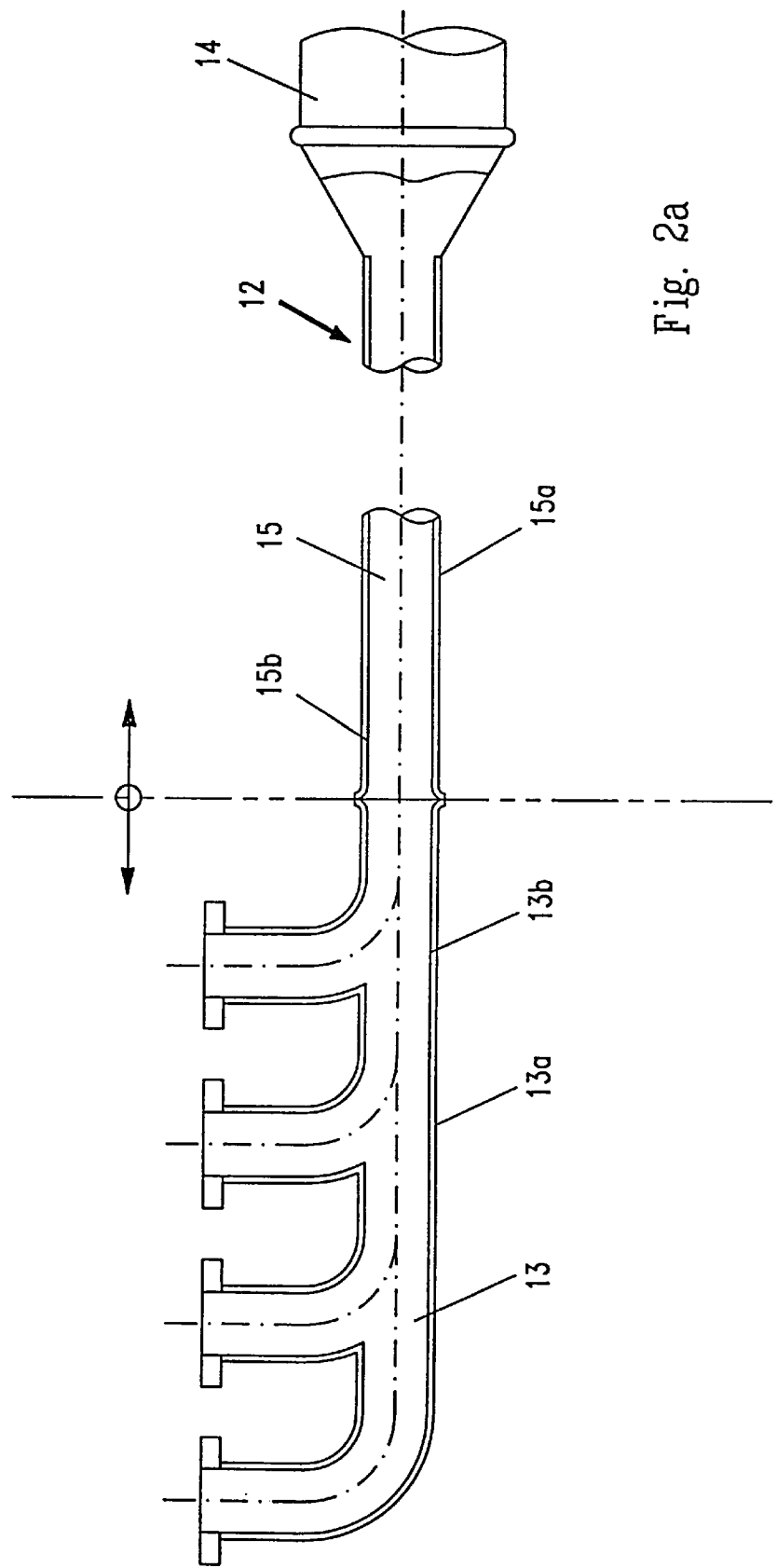

ASSEMBLY FOR REDUCING THE EXHAUST GAS EMISSIONS OF AN INTERNAL COMBUSTION ENGINE

BACKGROUND OF THE INVENTION

The present invention relates to an assembly for reducing the exhaust gas emissions of an internal combustion engine, in particular for an automotive vehicle combustion engine, including a catalytic converter.

As has been proposed in the prior art, catalytic converters of combustion engines are provided with electrical heating means for heating the catalytic converter at cold start, and with a thermally insulated exhaust gas tube between the engine and the catalytic converter, in order to reduce the high exhaust gas emissions at cold start which result from the catalytic converter having not yet reached its operative temperature necessary for a proper functioning thereof.

In order to minimize the expenditure of the electrical heating of the catalytic converter and to reduce heat losses through the exhaust gas conduit, the catalytic converter should be positioned as close as possible to the engine. This, however, will be in conflict with excessive heat situations where the extremely hot exhaust gases may detrimentally affect the catalytic converter.

In order to meet these conflicting requirements German patent application 23 03 773 proposes to divide the exhaust gas conduit between the engine and the catalytic converter into a pair of conduit branches of substantially different lengths, with the longer branch extending in a loop so as to allow for sufficient cooling of the exhaust gases at full load, even though the catalytic converter is positioned relatively close to the engine. This design suffers from substantial space requirements for the loop-shaped conduit branch.

This is why German patent application 42 18 834 proposes to position the catalytic converter remote from the engine such that excessive heating at cold start will be avoided and to divide the exhaust gas conduit between the engine and the catalytic converter into a pair of conduit branches being of the same length, however, of different cross-sectional areas, with the branch of smaller cross-sectional area receiving all of the exhaust gas when the catalytic converter is cold. The purpose of this design is to feed the exhaust gas to the still cold catalytic converter while it has not been cooled significantly. This is so because the exhaust gas flows through the small cross-section of the used conduit branch at a higher speed than it would flow through the total cross-sectional area of both branches of the exhaust gas conduit. However, in this prior design both conduit branches are in heat exchange relationship with the ambient air so that thermal energy of the exhaust gas be directly transferred to the ambient air via the conduit walls.

SUMMARY OF THE INVENTION

It is an object of the present invention to provide an assembly for reducing the exhaust gas emissions of an internal combustion engine including a catalytic converter wherein at operational conditions of heat deficiency the catalytic converter receives the exhaust gases at maximum temperatures and at operational conditions of excessive heat the catalytic converter receives the exhaust gases at minimal temperatures. A further object is to provide such an assembly at low costs and minimal space, weight and fuel consumption requirements. Furthermore, consumption of electrical energy for heating the catalytic converter at operational conditions of heat deficiency should be minimized without detracting from the efficiency of cabin heating. Rapid heating of the engine should be possible not only at cold start but also at brief interruptions of engine operation or when the engine is cooled during idling.

To achieve the above described objects, there is provided an assembly including an exhaust gas conduit adapted to be connected to an exhaust gas outlet of an engine and a catalytic converter for receiving exhaust gases from the gas conduit. The gas conduit has a pair of conduit branches along a portion of its length. The pair of conduit branches having at least one partial load type and at least one full load tube. The full load tube is in heat exchange with ambient. The conduit branches are of different designs as to their thermal influence upon the exhaust gases. Control means is provided to control dividing and conducting the exhaust gas flow through the branches in response to operative parameters of the engine. At least one of the partial load tubes is disposed within at least one full load tube such that the full load tube has an annular cross-sectional area.

The terms partial load tube and full load tube have been chosen for definition purposes with reference to relevant operational conditions. Full load is considered to be an operational condition where the exhaust gas temperature corresponds at least to the operative temperature of the catalytic converter, while partial load is considered to be an operational condition where the exhaust gas temperature and the catalytic converter temperature are less than the operational temperature of the catalytic converter. The use of the term "tube" is intended not to exclude any other suitable conduits for conducting gases nor conduits which comprise more than one tube and which are of a cross-sectional shape other than a circular cross-sectional shape.

In the assembly for reducing the exhaust gas emissions of a combustion engine of the present invention the annular space between the partial load tube and the full load tube serves as an insulating gap or interspace which prevents the partial load tube from dissipating thermal energy into the ambient air.

BRIEF DESCRIPTION OF THE DRAWINGS

With reference to the accompanying drawings preferred embodiments of the invention will be explained in more detail. In the drawings:

FIG. 2a shows the exhaust gas manifold of a four-cylinder combustion engine including a conventional exhaust gas tube extending to a catalytic converter;

FIG. 2b shows an exhaust gas tube according to the invention replacing the exhaust gas tube of FIG. 2a;

FIG. 7a is a view of the valve for closing the full load tube at an enlarged scale and FIG. 8 shows a modification of the system in FIG. 1 including a prearranged catalytic converter.

DETAILED DESCRIPTION OF THE PREFERRED EMBODIMENT

Figure 1:
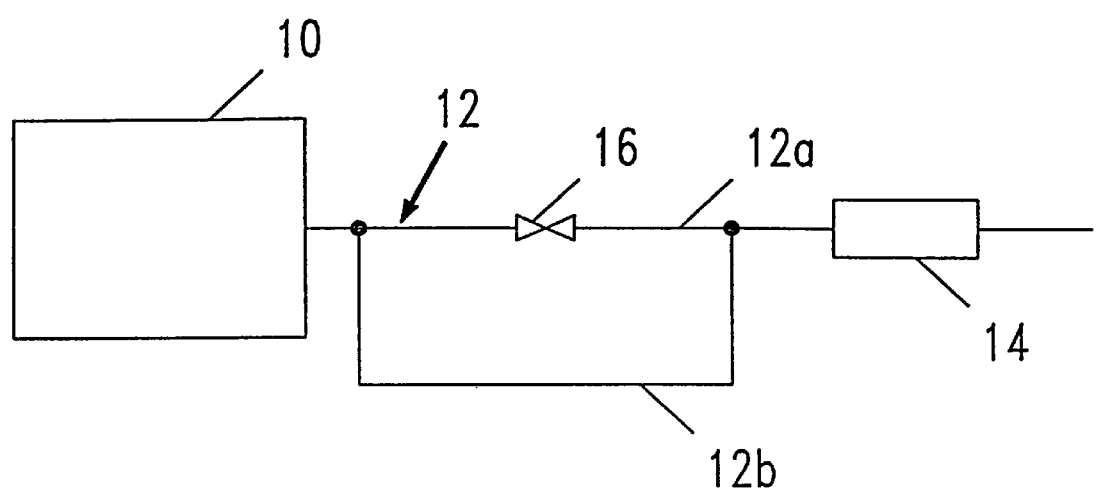
FIG. 1 is a schematic diagram of an exhaust gas system of a combustion engine for explanation of the basic principles of the present invention.

In FIG. 1 an internal combustion engine 10 has its exhaust gases discharged through an exhaust gas conduit 12 including a catalytic converter 14. Exhaust gas conduit 12 is formed by a pair of branches 12a and 12b along the greater part of its length between the engine 10 and the catalytic converter 14. A closure valve 16 is disposed in branch 12a. When closure valve 16 is closed, the exhaust gases flow to the catalytic converter 14 only via branch 12b which extends within branch 12a.

As will be explained in more detail below, branch 12a is of a design to enhance heat transfer to the ambient air while branch 12b is of a design with respect to the chosen material, the through-flow cross-sectional area and its arrangement such as to effectively prevent heat losses of the exhaust gas flowing therethrough.

The valve 16 is controlled by not shown control means such that the valve 16 will be closed when the catalytic converter requires thermal energy to achieve or maintain its full effectiveness. The not shown control means is responsive directly or indirectly to the exhaust gas temperature of engine 10 and/or the operational temperature of the system indicating the temperature in the area of the catalytic converter 14. A condition of heat deficiency occurs after cold start and normally also when the exhaust gas temperature due to operational circumstances falls below the temperature necessary for the catalytic function of the catalytic converter, with this operational condition being designated as "partial load" for simplicity reasons while other operational conditions will be designated as "full load". When there is a condition of heat deficiency, the exhaust gases are conducted through branch 12b, with valve 16 being closed, in order to enable use of thermal energy of the exhaust gas at minimal losses for heating the catalytic converter 14. This is why the branch 12b is being designated as "partial load tube" and the branch 12a is being designated as "full load tube".

FIG. 2a shows an exhaust gas manifold as known for preventing heat losses of the exhaust gas. The elbow-type exhaust gas manifold 13 and the following conduit portion 15 extending to the catalytic converter 14 each are of double-walled structure including an external tube 13a and, respectively, 15a, and an internal tube 13b and, respectively, 15b. The exhaust gases flow within the thin-walled internal tube 13b and, respectively, 15b, and the annular space between the external tube 13a, 15a on the one hand and the internal tube 13b, 15b on the other hand receives no fluid flow and serves as an insulation gap.

Figure 2B:
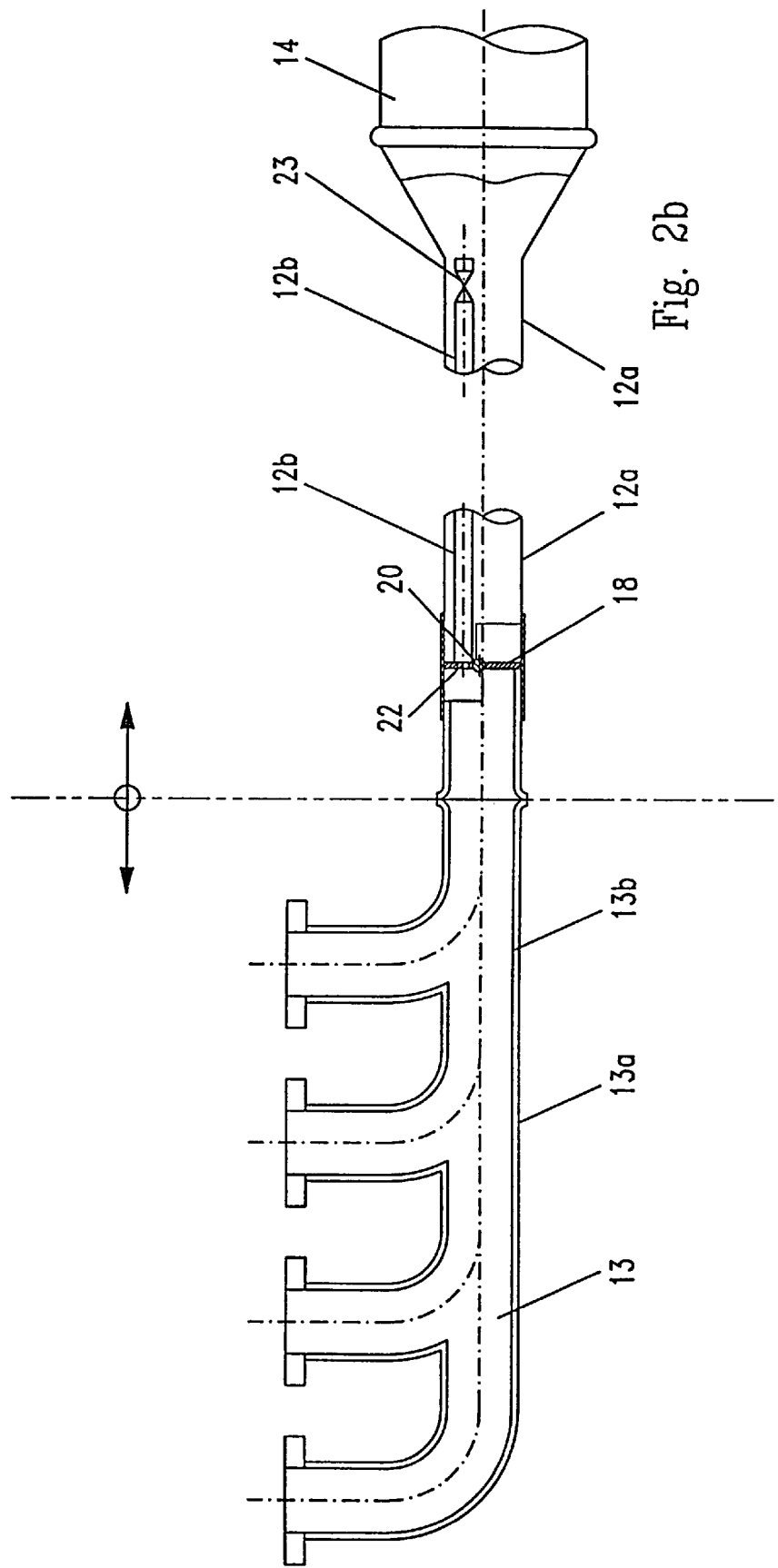

Partial load tube 12b may be of a substantially smaller cross-sectional area than full load tube 12a so that partial load tube 12b can be positioned within full load tube 12a as shown in FIG. 2b. Contrary to the already known arrangement as shown in FIG. 2a, the cross-sectional area of partial load tube 12b will be substantially smaller than the cross-sectional area of the full load tube 12a so that full tube 12a surrounds partial load tube 12b so as to provide for an annular space therebetween. Partial load tube 12b may be positioned for example excentrically within full load tube 12a such that it extends in spaced relationship to a longitudinal central plane and to the inner wall of the full load tube 12a. This enables to have control valve 16 comprise a simple rotary flap 18 having an axis of rotation 20 extending in said longitudinal central plane and which is adapted to cover the cross-sectional area of full load tube 12a when it is in a closing position. The portion of valve flap 18 which covers the flow cross-sectional area of the partial load tube 12b when the valve is in its closing position includes a through-hole 22 such that the exhaust gases can flow only through partial load tube 12b.

In the assembly as shown in FIG. 2b the prior art double-walled elbow-type manifold 13 is being used, and the exhaust gas conduit of the invention comprising full load tube 12a and partial load tube 12b follows manifold 13 instead of conduit portion 15. In order not to interfere with opening movements of valve flap 18, both the end of manifold 13 and the end of full load tube 12a each are provided with a recess which extends beyond the radial plane defined by pivot axis 20 for a length corresponding to the thickness of valve flap 18. When the valve is in the closed position valve flap 18 engages the non-recessed portion of manifold 13 and partial load tube 12b.

Figure 2C:
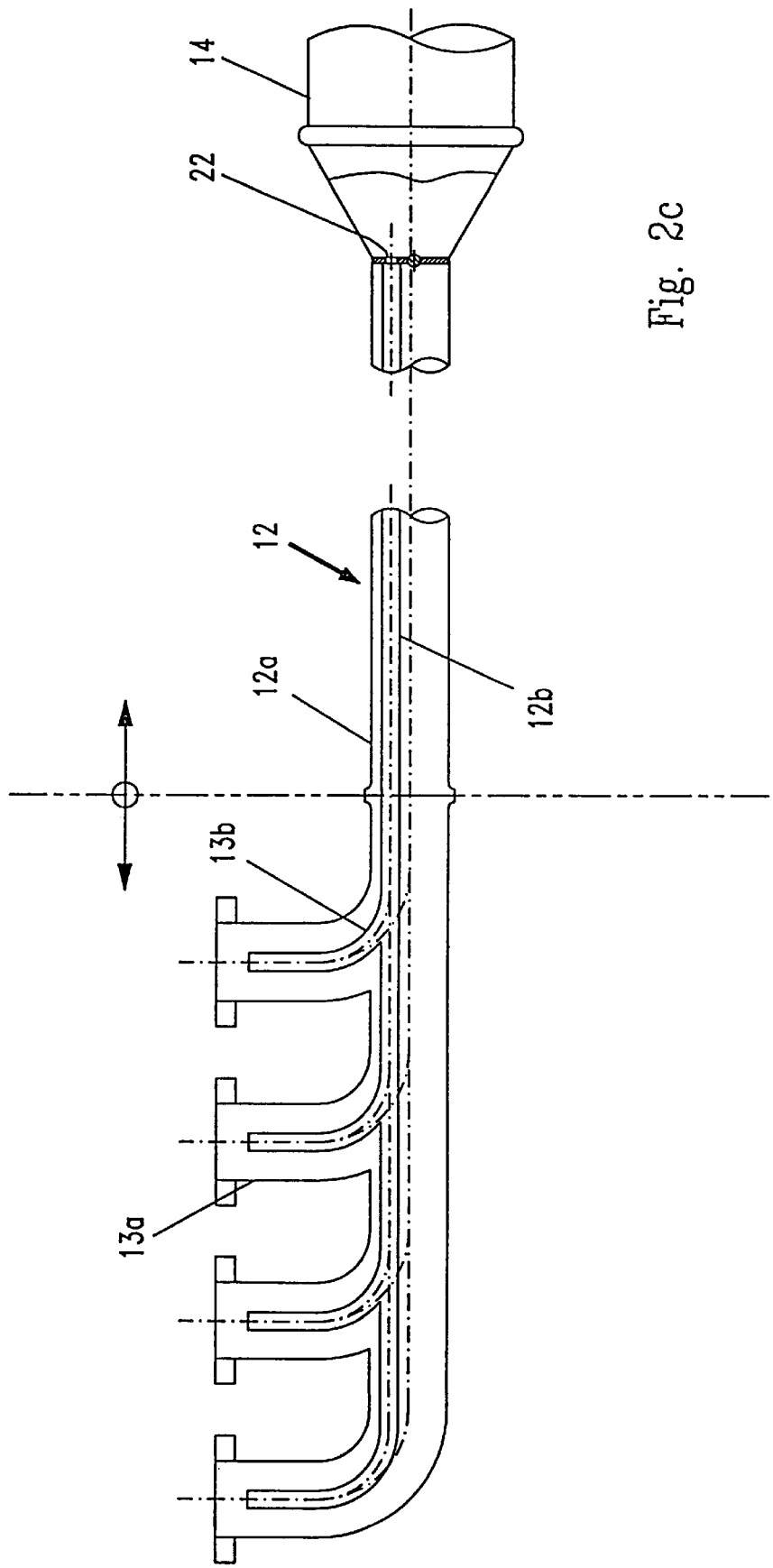
FIG. 2c which is similar to FIG. 2b shows another embodiment of the invention.

FIG. 2c shows a modified embodiment wherein full load tube 12a forms a single wall extension of elbow-type manifold 13a and partial load tube 12b extends into manifold 13a so as to form branches 13b therein. In this case valve 16 is positioned at the end of tubes 12a and 12b adjacent catalytic converter 14.

In the embodiments of FIGS. 2b and 2c partial load tube 12b opens into a funnel-shaped enlargement 25 of full load tube 12a so that catalytic converter 14 is fully loaded by the exhaust gases exiting from partial load tube 12b.

Figure 3:
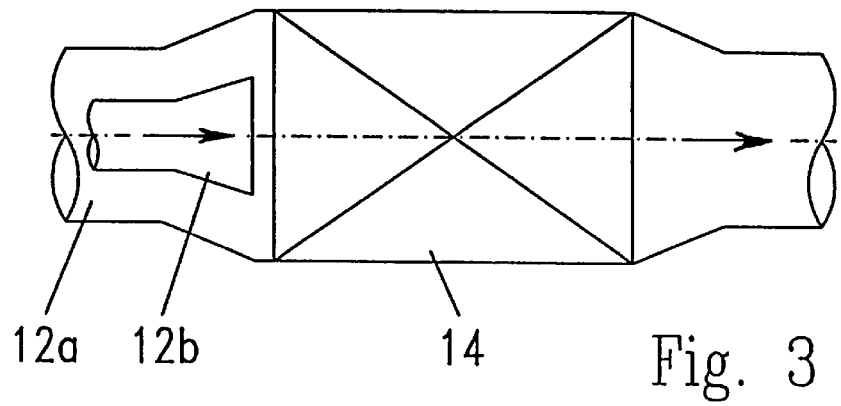
FIG. 3 is a detailed view of another embodiment including an enlarged outlet of the partial load tube.

In the modified version of FIG. 3 partial load tube 12b terminates immediately ahead of catalytic converter 14 so that, at conditions of partial load when valve 16 is closed, only a partial cross-sectional area of catalytic converter 14 receives exhaust gases which exit solely from partial load tube 12b in order to be heated more rapidly to its operative temperature. As already mentioned, the cross-sectional area of partial load tube 12b may be made very small relative to the cross-sectional area of full load tube 12a. In order to ensure loading of a sufficient cross-sectional area of the catalytic converter for effective exhaust gas decontamination, the opening area of partial load tube 12b is tapered to enlarge its cross sectional area to a desired value.

Figure 4:
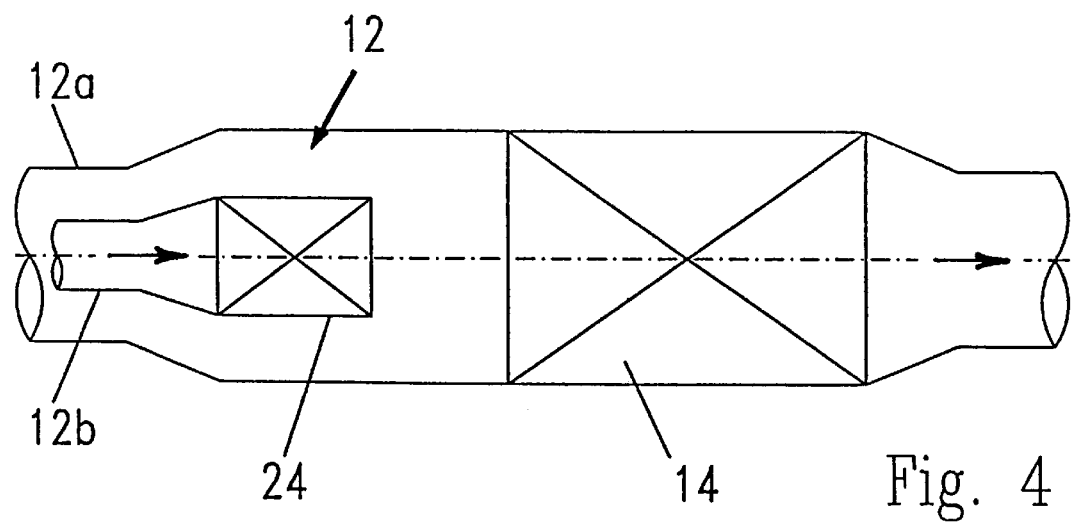
FIG. 4 shows an assembly similar to that of FIG. 3, however, including a prearranged catalytic converter.

FIG. 4 shows a similar arrangement wherein, however, the enlarged opening of partial load tube 12b is connected to a prearranged catalytic converter 24 which is positioned within full load tube 12a in spaced relationship to main catalytic converter 14.

Figure 5:
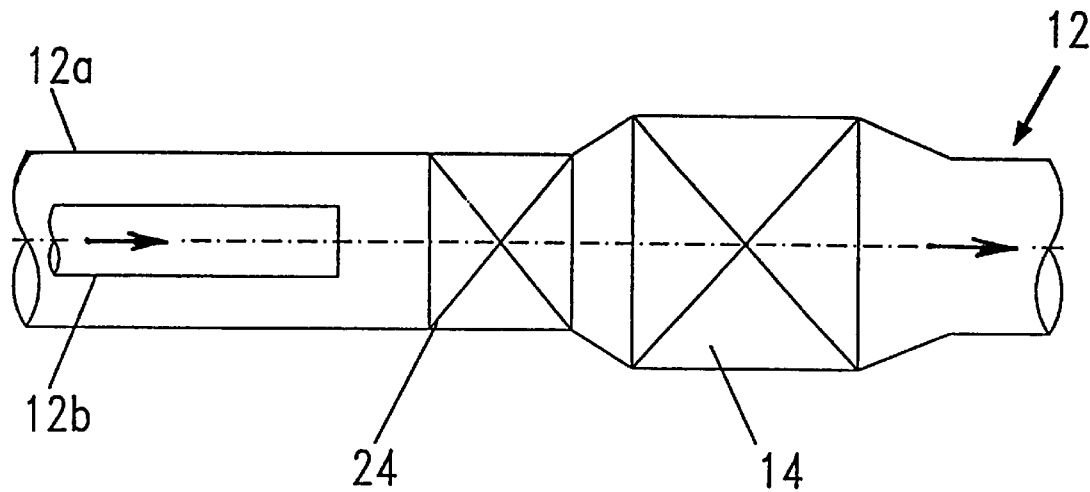
FIG. 5 shows a further variant similar to FIG. 4.

In the modified embodiment of FIG. 5 there is also provided a prearranged catalytic converter 24 which, however, is positioned within full load tube 12a in spaced relationship to the opening of partial load tube 12b such that it always receives all of the exhaust gases exiting from exhaust gas conduit 12.

Figure 6:
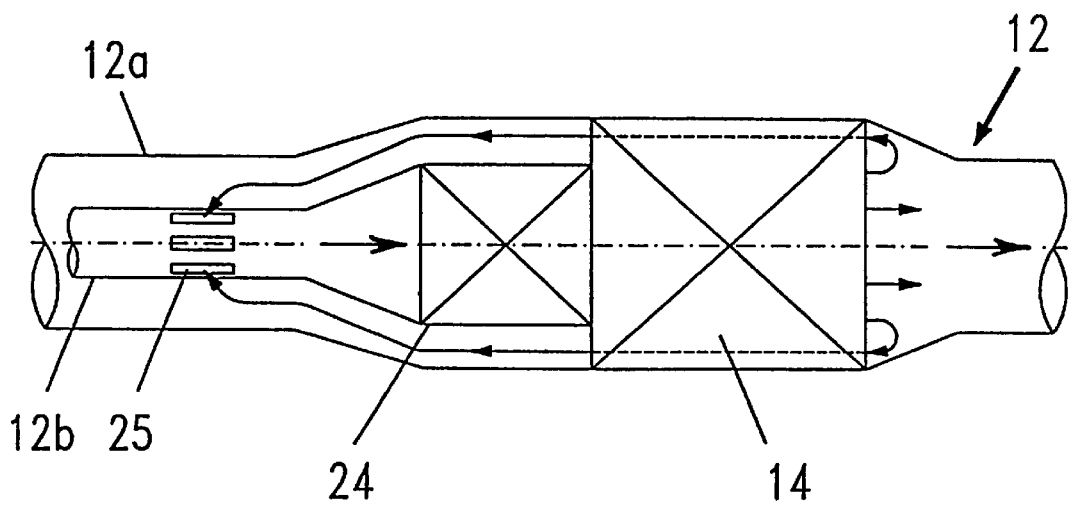
FIG. 6 shows another embodiment with means for recirculating fluid flow via the main catalytic converter.

A particularly preferred embodiment is shown in FIG. 6. The prearranged catalytic converter 24 communicates—as in FIG. 4—to one end of a partial load tube 12b which forms a funnel-shaped enlargement upstream of prearranged catalytic converter 24, and is of a smaller cross-section than the portion of full load tube 12a which surrounds it. The main catalytic converter 14 follows directly the end of prearranged catalytic converter 24 and fills completely full load tube 12a. The partial load tube 12b is provided with a number of through-holes 25 at its periphery up-stream of its funnel-shaped enlargement. As a result thereof, Venturi action generates suction in the area of through-holes 25 which causes backflow of the exhaust gases exiting main catalytic converter 14 through the marginal zone of the main catalytic converter 14 which is preheated thereby already at partial loads, and back into partial load tube 12b, while the internal area of catalytic converter 14 is heated more strongly.

Figure 7:
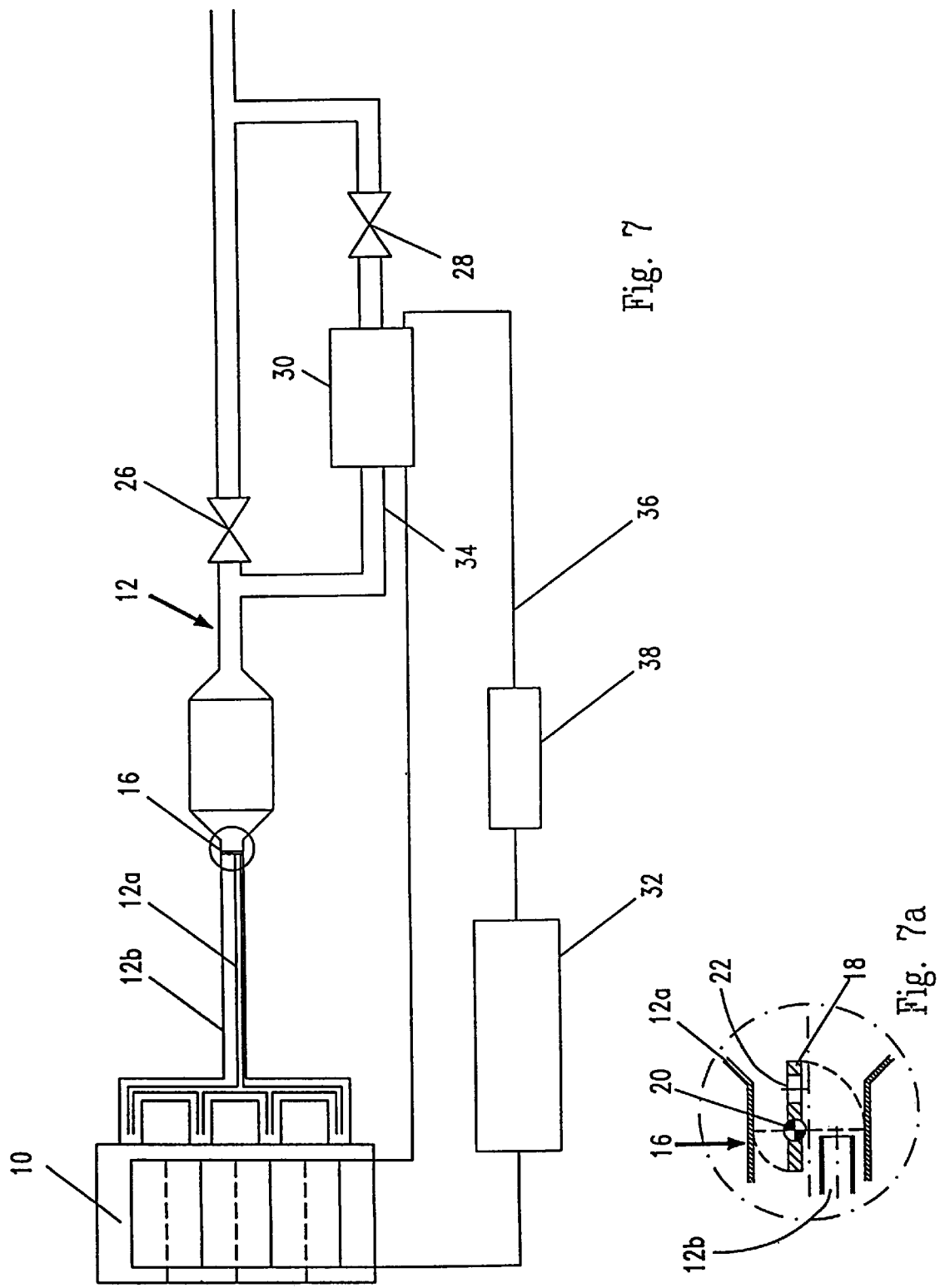
FIG. 7 shows an exhaust gas system similar to FIG. 2c including a heat exchanger following the catalytic converter.

FIG. 7 shows a schematic diagram of an exhaust gas system explained already with reference to FIG. 2c, while some additional measures for rapidly heating the system are shown, i.e. a throttle valve 26 or 28, a heat exchanger 30 and a heat storage 32 which is preferably a latent heat storage.

When a valve 26 positioned in a bypass 34 parallel to exhaust gas conduit 12 is closed, the exhaust gases are conducted across a heat exchanger 30 positioned in bypass 34 so that the still present exhaust heat energy can be fed to engine 10 via the cooling water circuit or air and mixture preheating means. Due to the recovery of exhaust heat energy fuel consumption of the engine may be reduced for about 10 to 20% during partial load operation, while the output of the cabin heating may be increased. The effectivity may be even enhanced by the use of throttle valve 28, as a result of improved heat transfer in heat exchanger 30 as well as due to ram pressure effective in engine 10. If desired valve 26 may be used as a throttle valve acting upon engine 10 if heat exchanger 30 is not to be used.

The cooling fluid system of engine 10 has been schematically shown and has been designated by 36. It has associated therewith a latent heat storage 32 for transferring heat to engine 10 at conditions of heat deficiency, as well as the usual heat exchanger 38 for heating the vehicle cabin.

Figure 8:
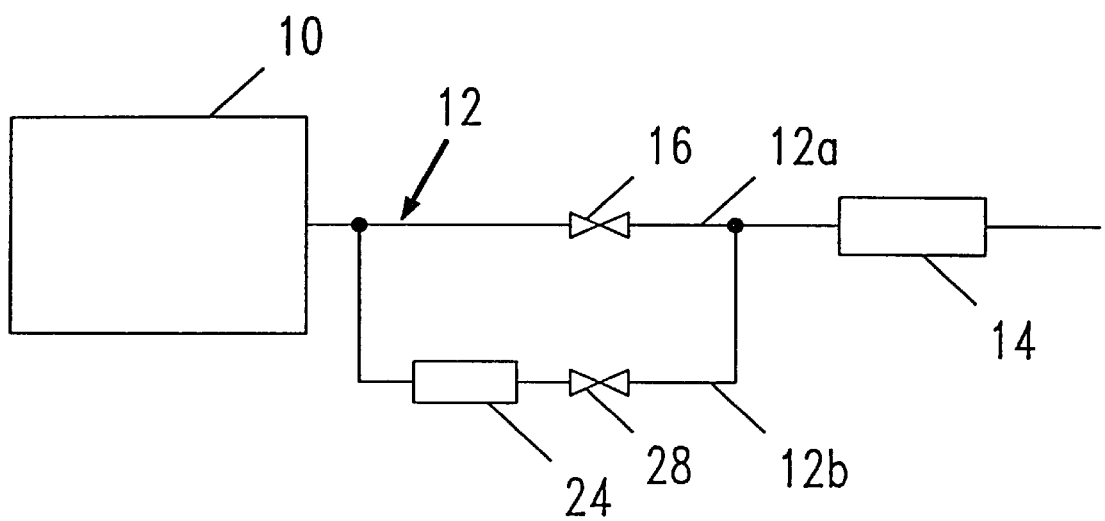

In the variant shown in FIG. 8 partial load tube 12b extends partially outside of full load tube 12a in order to receive within this portion prearranged catalytic converter 24 and a valve 28 following the latter. This allows to position prearranged catalytic converter 24 very close to engine 10, which enhances rapid heating thereof. It may be switched off by valve 28 in order to avoid that hot gases flow therethrough.

The ram pressure valve to be used for rapidly heating the engine during start and partial load operation may be positioned at any location of the conduit path through which the exhaust gases flow when valve 16 is closed (FIG. 1), i.e. for example downstream of catalytic converter 14.

I claim:

1. An assembly for reducing the exhaust gas emissions of an internal combustion engine for an automotive vehicle, including an exhaust gas conduit (12) adapted to be connected to exhaust gas outlet means of said combustion engine (10), and a catalytic converter (14) receiving exhaust gases from said exhaust gas conduit, said exhaust gas conduit comprising, at least along a portion of its length, a pair of conduit branches comprising at least one partial load tube (12b) having a first cross-sectional area and at least one full load tube (12a) having a second cross-sectional area, the latter of which is in heat exchange relationship with the ambient, said first cross-sectional area being 10 to 100 times smaller than said second cross-sectional area, control means (16) being provided selectively to control dividing and conducting exhaust gas flow through said conduit branches in response to operative parameters of said combustion engine, said at least one partial load tube (12b) being disposed within said at least one full load tube (12a) such that said second cross-sectional area of said at least one full load tube defines an annular flow area which protects said at least one partial load tube (12b) from heat losses, and said first cross-sectional area being dimensioned so as to provide for a ram pressure when sand control means causes the exhaust gases to flow through said at least one partial load tube.

2. An assembly as defined in claim 1, wherein said partial load tube (12b) is thermally insulated.

3. An assembly as defined in claim 1, wherein said full load tube (12a) is adapted to be closed by said control means (16).

4. An assembly as defined in claim 3, wherein said control means (16) comprises a valve flap (18) arranged in the first cross-sectional area at one end of said partial load tube (12b) such as to close said full load tube (12a) when it is in a closing position, said valve flap (18) having a through-hole (22) which uncovers the first cross-sectional area of the partial load tube (12b) when the valve flap is in its closing position.

5. An assembly as defined in claim 1, wherein said partial load tube (12b) has, adjacent said combustion engine, a branched-off end (13b) extending into branches (13a) of an exhaust gas manifold forming a portion of said full load tube (12a), and said control means (16) is disposed at an opposite end of said partial load tube (12b).

6. An assembly as defined in claim 1, wherein said partial load tube (12b) extends to a location immediately upstream of said catalytic converter (14).

7. An assembly as defined in claim 1, wherein said catalytic converter (14) serves as a main catalytic converter and a prearranged catalytic converter (24) is arranged upstream of said main catalytic converter.

8. An assembly as defined in claim 7, wherein said prearranged catalytic converter (24) is disposed in the flow path of the exhaust gases flowing through said partial load tube (12b).

9. An assembly as defined in claim 7, wherein said prearranged catalytic converter (24) communicates with the downstream end of said partial load tube (12b).

10. An assembly as defined in claim 8, wherein said prearranged catalytic converter (24) is disposed within said full load tube (12a) so as to follow the downstream end of said partial load tube (12b).

11. An assembly as defined in claim 1, wherein the first cross-sectional area of said partial load tube (12b) is dimensioned such that said ram pressure caused by said partial load tube (12b) at a predetermined operational condition does not exceed a predetermined value.

12. An assembly as defined in claim 11, wherein the ram pressure caused by said partial load tube (12b) at a rotational speed of 2500 rpm and a load factor of 0.7 does not exceed 0.5 bar.

13. An assembly as defined in claim 11, wherein one of the operational parameters for controlling said control means (16) is the ram pressure in the partial load tube (12b) such that a valve flap (16) will be opened when the ram pressure exceeds a predetermined value.

14. An assembly as defined in claim 13, wherein said control means (16) acts also as a pressure limiting valve having an adjustable opening threshold.

15. An assembly as defined in claim 14, wherein said adjustable opening threshold of said pressure limiting valve (16) is about 0.6 bar.

16. An assembly as defined in claim 1, wherein a ram pressure valve (23, 26, 8) is dispose in the flow path of the exhaust gases flowing through said partial load tube (12b).

17. As assembly as defined in claim 1, wherein a prearranged catalytic converter (24) and a closure valve (28) are disposed in a portion of said partial load tube (12b) which extends outside of said full load tube (12a).

18. An assembly as defined in claim 17, wherein said closure valve (28) is a throttle valve.

* * * * *